(No Model.) 2 Sheets—Sheet 1.
O. T. CONGER.
WATER HEATER.
No. 436,575. Patented Sept. 16, 1890.
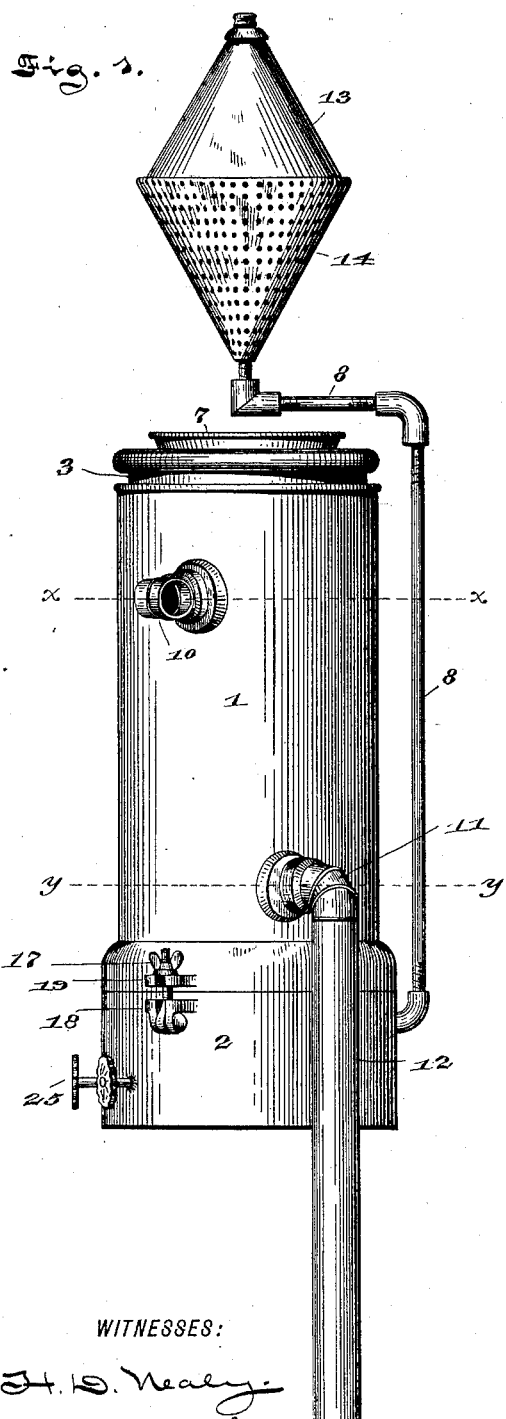
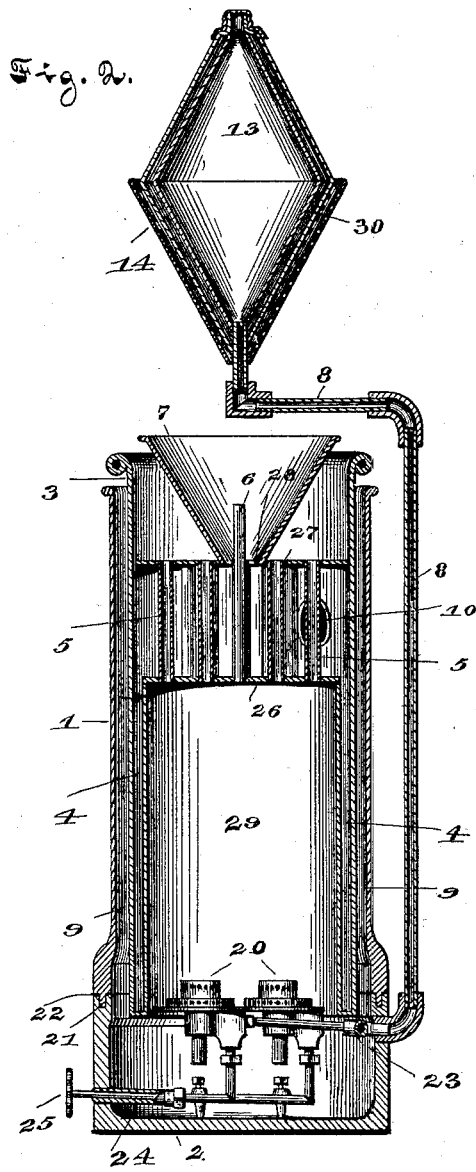
WITNESSES:
H. D. Nealy
E. B. Griffith
INVENTOR
Omer T. Conger
BY
C. P. Jacobs.
ATTORNEY
THE NORRIS PETERS CO., PHOTO-LITHO., WASHINGTON, D. C.

(No Model.) 2 Sheets—Sheet 2.
O. T. CONGER.
WATER HEATER.
No. 436,575. Patented Sept. 16, 1890.
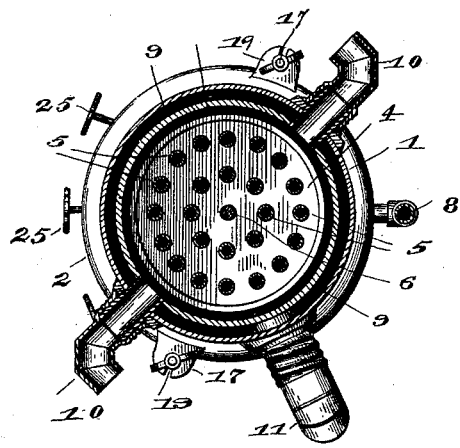
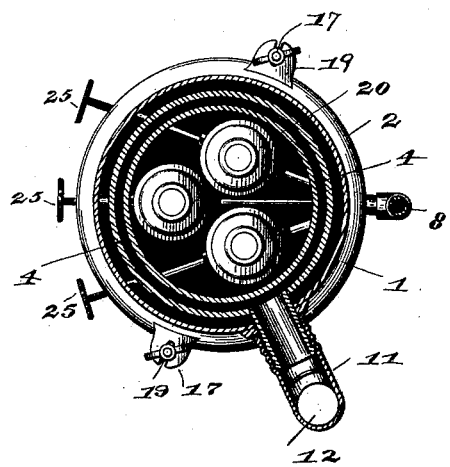
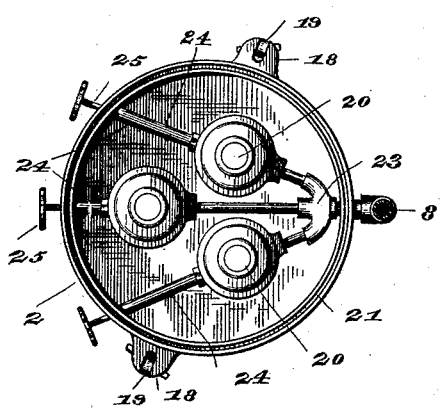
WITNESSES:
INVENTOR
Omer T. Conger,
BY
C. P. Jacobs.
ATTORNEY

UNITED STATES PATENT OFFICE.

OMER T. CONGER, OF INDIANAPOLIS, INDIANA.

WATER-HEATER.

SPECIFICATION forming part of Letters Patent No. 436,575, dated September 16, 1890.

Application filed March 6, 1890. Serial No. 342,905. (No model.)

*To all whom it may concern:*

Be it known that I, OMER T. CONGER, of Indianapolis, county of Marion, and State of Indiana, have invented certain new and useful Improvements in Water-Heaters; and I do hereby declare that the following is a full, clear, and exact description thereof, reference being had to the accompanying drawings, in which like figures refer to like parts.

My invention relates to the construction of devices for heating water, and is intended to be used in vats, tubs, or similar receptacles, the device being set directly into the water and capable of being removed therefrom by lifting out, and having no connection whatever with the tub itself, and will be understood from the following description.

In the drawings, Figure 1 is a general elevation of my device. Fig. 2 is a vertical section of Fig 1. Fig. 3 is a cross-section on the line x x. Fig. 4 is a similar section on the line y y, Fig. 1. Fig. 5 is a top view of the heater or lamp-holder.

In detail the device consists of the outer cylindrical shell 1, having a tongue 21, which is adapted to fit water-tight in a groove 22, formed in the base or heater 2, the latter containing the lamps 20.

Within the outer shell 1 and separated therefrom by the intervening air-space 9 is a second shell 3, which has a water-chamber 4 within its walls, its interior forming a heat-chamber 29, so that the heat from the burners 20 may pass directly up into and fill the open space which is surrounded by the water-jacket.

At 26 is the bottom head of the water-chamber 4. Pipes 5 connect the heads 26 and 27 of the water-chamber, opening into the heat-chamber 29 below, so that any smoke from the lamps may pass up through them and to the open air above.

7 is a filling-funnel, which has openings 28 in its bottom, a central stay-rod 6 connecting it with the heads 26 and 27 below. The water being poured into this funnel passes down through the holes 28 into the interior of the water-chamber 4, and it is intended to be used for filling such chamber in the first instance. Thus arranged the water-chamber surrounds the heat-chamber 29 and extends above it, and the pipes 5 provide a draft for the lamps through the top of the water-chamber, the smoke and surplus heat escaping into the open air above and around the funnel 7. The lamps are supplied with gasoline from the receptacle 13, which is connected by a pipe 8 with the three-branch coupling 23, from which other pipes lead directly to the reservoirs of the lamps.

24 are pipes leading from the lamps, within which move the valve-rods 25 for regulating the burners.

The main body of the heater 1 is united to the lamp-receptacle 2 by a joint formed by the tongue and groove 21 22, and the parts are locked together by means of thumb-screws and bolts 17, hinged at 18 to the bottom 2 and passing through lugs 19, fastened to the top 1.

12 is a cold-water suction-pipe which is connected to the outer shell 1 by an elbow 11, secured to a short pipe which passes through it and into the water-chamber 4.

10 are outlet-pipes connected to the inner water-chamber, passing through the outer shell 1, having elbows turned in opposite directions, as shown in Fig. 3, and are intended to convey the hot water from the interior into the cold water of the tub or vat in which the heater is set.

The device operates as follows: Water being poured into the funnel 7 passes down through the holes 28 into the water-chamber 4 until it is filled as full as desired. The lamps 25 being lighted, the whole device is set in the water tub or vat, where it floats. The water in the chamber 4 is gradually heated, and when hot enough it is discharged through the outlets 10 in opposite directions, giving a rotary motion to the heater. The suction-pipe 12 extends down below the heater into the cold water of the vat or tub, and as the hot water is forced out of the pipes 10 the cold water is drawn up through the suction-pipe 12, replenishing the water-chamber 4, the suction being created by the vacuum caused by the discharge through the pipes 10. Thus the whole device floats and revolves in the tub, throwing the hot water on all sides during its rotary movement and diffusing it through the cold water.

Of course the heat escaping around the funnel 7 would tend to raise the temperature of the fluid-receptacle 13, and in order to prevent this the latter is preferably surrounded by an air-space 30, and its lower part also by a gauze screen 14, of similar shape. This supply-tank is not herein separately claimed, but will be made the subject of a separate application for Letters Patent.

The device when filled will sink into the water some distance above the outlet-pipes 10, so that they discharge their hot water and steam directly below the surface of the water in the tub or vat. Water cannot get into the lamp-receptacle, for the joint between the parts 1 and 2 is intended to be water-tight.

The space 9 between the outer shell 1 and the shell of the water-chamber 3 allows the air to descend for supplying and creating a draft for the lamps.

The supply-tank is made of the conical shape indicated, so that the heat that arises from the lamps will strike it laterally and not directly, the bulk being radiated away from the tank by the sides of the cone. The inlet and outlet pipes are fastened on with screw-caps, and when the tank is to be filled they are all turned so as to throw the pipes up and prevent the escape of the water.

What I claim as my invention, and desire to secure by Letters Patent, is the following:

1. In a water-heater, an outer shell 1, a base-heater 2, having lamps detachably connected to such shell, an inner shell 3, having a water-chamber 4 therein, opposite outlet-pipes 10, connecting the inner and outer shells 1 and 3 and tapping the water-chamber 4 and terminating in elbows, pipes 5, passing through the upper part of the water-chamber 4, for creating a draft for the lamps, a heat-chamber 29 above the lamps, formed by the downward-extended walls of the water-chamber, and a suction-pipe 12, tapping the water-chamber 4 and extending through the outer shell and down below the heater, all combined substantially as described.

2. In a water-heater, an outer shell 1, inner shell 3, having water-chamber 4, outlet-pipes 10, located opposite each other, tapping the water-chamber, for discharging steam into the tank to be heated, such pipes connecting the outer and inner shells and terminating in elbows, a heater 2, detachably connected to the outer shell, a heat-chamber above such heater, formed by the inner wall of the water-chamber, and a suction-pipe 12, tapping such water-chamber and passing through the outer shell down to the water in the tank below, for supplying the interior water-chamber, all combined substantially as described.

3. In a water-heater, an outer shell 1, a heater 2, detachably connected at the bottom thereof, an inner shell 3, having its walls extended downward, forming a water-chamber 4 therein, its lower part surrounding a heat-chamber 29, formed by its inner wall, draft-pipes 5 through the upper part of such water-chamber leading to the open air, a suction-pipe 12, tapping the water-chamber 4 through the outer shell 1, for supplying water to the heater, and hot-water-outlet pipes 10, also tapping the water-chamber 4 and passing through the outer shell 1, such pipes located diametrically opposite each other and terminating in elbows, whereby the discharge of the heated fluid creates a rotary motion in the heater as it floats in the tank, all combined substantially as shown and described.

4. In a water-heater, an outer shell 1, a heater 2, detachably connected to the bottom of such outer shell, an inner shell 3, inclosing a water-chamber 4, such water-chamber extended downward by prolonging the walls of the inner shell, whereby a heat-chamber 29 is formed within such walls above the heater, pipes 5, passing from such heat-chamber and through the upper part of the water-chamber to the open air, for creating a draft for the lamps of the heater, a suction-pipe 12, tapping the water-chamber 4 near its lower end and passing through the outer shell 1 and extending down to the water-supply below, outlet-pipes 10, tapping the water-chamber near its upper end and on diametrically-opposite sides and passing through the outer shell and terminating in elbows 1, for delivering the heated water and steam into the tank in which the heater is set, whereby the discharge of the heat creates a rotary motion for the heater as it floats in the tank, and an exterior funnel 6, connected to the top and having openings into the water-chamber for supplying the heater with water in the first instance, all combined substantially as shown and described.

In witness whereof I have hereunto set my hand this 22d day of February, 1890.

OMER T. CONGER.

Witnesses:
 C. P. JACOBS,
 E. B. GRIFFITH.